Oct. 6, 1925.

L. H. LISK 1,556,230

COFFEE COOLING MACHINE

Filed Aug. 2, 1924    3 Sheets-Sheet 2

Inventor
Lucius H. Lisk
By his Attorneys

Patented Oct. 6, 1925.

1,556,230

UNITED STATES PATENT OFFICE.

LUCIUS H. LISK, OF MINNEAPOLIS, MINNESOTA.

COFFEE-COOLING MACHINE.

Application filed August 2, 1924. Serial No. 729,701.

*To all whom it may concern:*

Be it known that I, LUCIUS H. LISK, a citizen of the United States, residing at Minneapolis, in the county of Hennepin and State of Minnesota, have invented certain new and useful Improvements in Coffee-Cooling Machines; and I do hereby declare the following to be a full, clear, and exact description of the invention, such as will enable others skilled in the art to which it appertains to make and use the same.

My invention provides a simple and highly efficient cooling device or apparatus especially adapted for the quick and proper cooling of coffee immediately following the roasting action, and, generally stated, the invention consists of the novel devices and combinations of devices hereinafter described and defined in the claims.

Chemists, who are experts in the treatment of coffee, agree that the desirable flavors are nearly all developed or fixed during the process of roasting, and during which roasting process the numerous complex elements are either liberated or made permanent. The roasting heat controlled in accordance with the skill of the "roaster", brings out new flavors not produced by unskillful manipulation, much as every day food is made palatable by the changes due to skillful cooking. Coffee experts know that these desirable flavors are very illusive, especially so while the mass contains surplus heat. Many experiments have been made with a view of getting rid of the disagreeable and unhealthful properties of coffee and these have been successful to some degree but at a cost not popular with the trade. Practically all previous devices cool entirely by air current, which carries away much of the best and most desirable essences of the coffee. While air reduces the strength of the coffee, it may, when its use is properly restricted, be utilized to carry away bad taints especially found in coffee of the cheaper grades that are frequently used as fillers to cheapen coffee blends.

In my improved cooler, the cooling of the coffee is produced chiefly or largely by cold radiation produced by the circulation of water through tubes of a rotary drum in which the coffee to be cooled is confined, and a very restricted circulation of air, only sufficient to carry off some of the undesirable vapors, is maintained through the drum.

This improved machine involves highly important features, which are illustrated in the accompanying drawings, wherein like characters indicate like parts throughout the several views.

Referring to the drawings.

Figure 3:
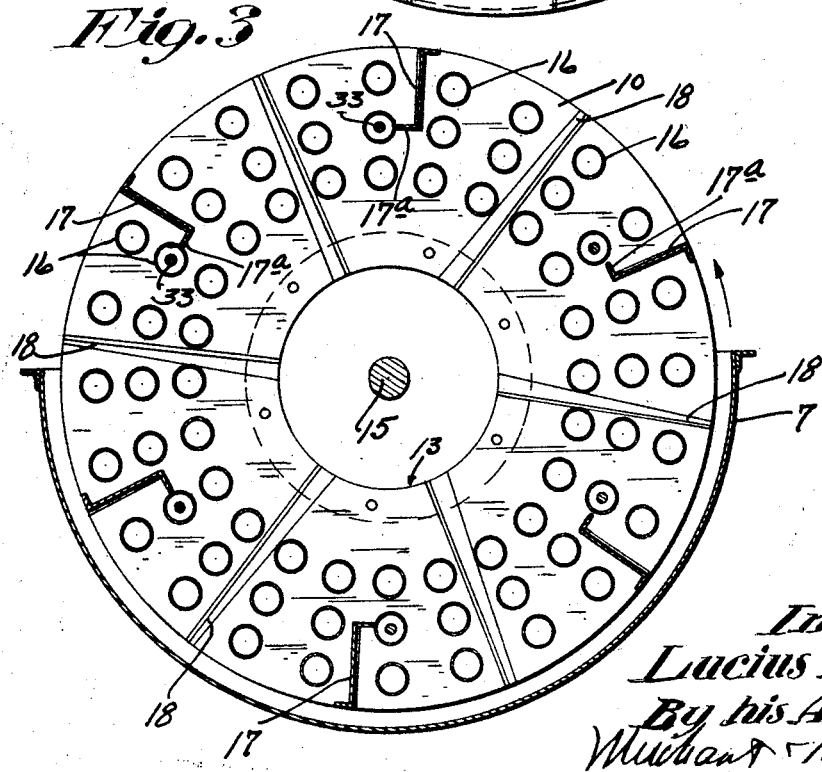
Fig. 3 is a transverse vertical section taken on the line 3—3 of Fig. 1, some parts being removed.
Figure 4:
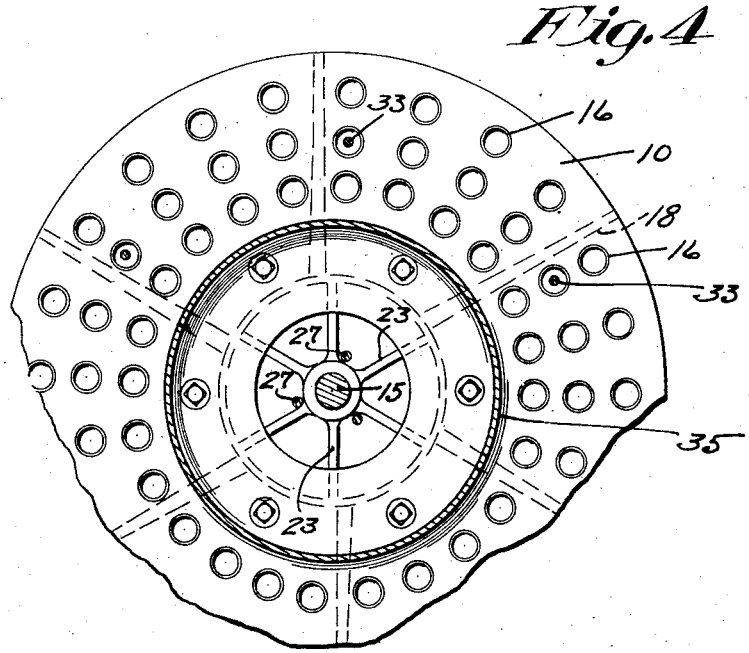
Fig. 4 is a front end elevation of the front head of the rotary drum, some parts being broken away.

The numeral 7 indicates a tank preferably semi-cylindrical in form and supported by a frame made up of end brackets 8 and tie rods 9. Working within the tank 7 is a horizontally disposed rotary drum 10, the front end or right-hand head of which has a large intake passage 11 and is secured to a spider bracket 12, while the rear or left-hand head of said drum has a large axial discharge passage 13 and is secured to a conical spider bracket 14 of a form to be hereinafter more fully described. The hubs of the spider brackets 12 and 14 are rigidly secured to an axial driving shaft 15, the ends of which project from the drum and are journaled in bearings formed by the upper ends of the frame brackets 8. Extended through the heads of the drum 10, on lines more or less close to the shell of the drum and very much eccentric to the shaft 15, are cooling tubes 16. As shown, there are three concentric series of circumferentially spaced tubes 16, but, of course, the number thereof may be varied. Interposed between certain of the tubes 16 are approximately radial lifting shelves 17 that are secured to the heads and shell of the drum. The direction of rotation of the drum is indicated by the arrow marked on Fig. 3, and it is important to note that the shelves 17, at their inner extremities, have flanges 17ª that project in the direction of rotation of the drum for a purpose which will presently appear. As shown, there are six of these lifting shelves, but the number may be varied. Interposed between the shelves 17 and secured to the rear drum head and projected inward some little distance therefrom are approximately radial elevating blades 18.

The drum described may be slowly rotated, say at about ten or twelve revolutions per minute, by any suitable means, but as shown, for this purpose, the shaft 15 is provided with a bevel gear 19 that meshes with a power-driven pinion 20.

The hot coffee from the roaster may be delivered into the cooling device from a spout 21 that terminates in a hopper-like discharge end 22 that projects into the drum through the intake passage 11. It may now be noted that the rear spider bracket 14 comprises a hub, a conical body, and an annular rim, which latter is directly bolted to the adjacent drum head, and it will be further noted that the said conical body and annular rim are rigidly connected by a plurality of plate-like webs 23 that are in planes that radiate from the axis of the shaft 15. As shown, there are six of these webs 23, interposed between the elevator blades 18. At their outer edges, the webs 23 terminate at an imaginary cylindrical surface, so that immediately around the same there is telescopically applied a cylindrical flow-control gate 24. This flow-control gate 24, by radial arms, is connected to a hub $24^a$ mounted to slide on the shaft 15. The conical body of the bracket 13, at its rim, is spaced from the cylindrical gate 24 so as to leave a constantly open annular air passage. The air passage through the gate 24 is covered by a screen 25 of such mesh that it will quite freely pass air therethrough but will hold back and prevent the flow of coffee. Mounted on the outer rear end of the shaft 15 is a grooved shipper hub 26, which, by bars or rods 27, is connected to the gate hub $24^a$. These rods 27 slide freely through the spider bracket 14 but rotate therewith and, consequently, with the drum and with the gate 24. The hub 26 may be shifted by any suitable well known means, such as a lever, not shown.

A funnel-like or flaring discharge spout 28 is secured to the rear drum head and constitutes an extension of the discharge passage 13 thereof. This spout 28 delivers into hood 29 having a discharge spout $29^a$, which, in turn, as here illustrated, opens into the air intake leg 30 of the suction fan 31 of a pneumatic elevator.

Figure 1:
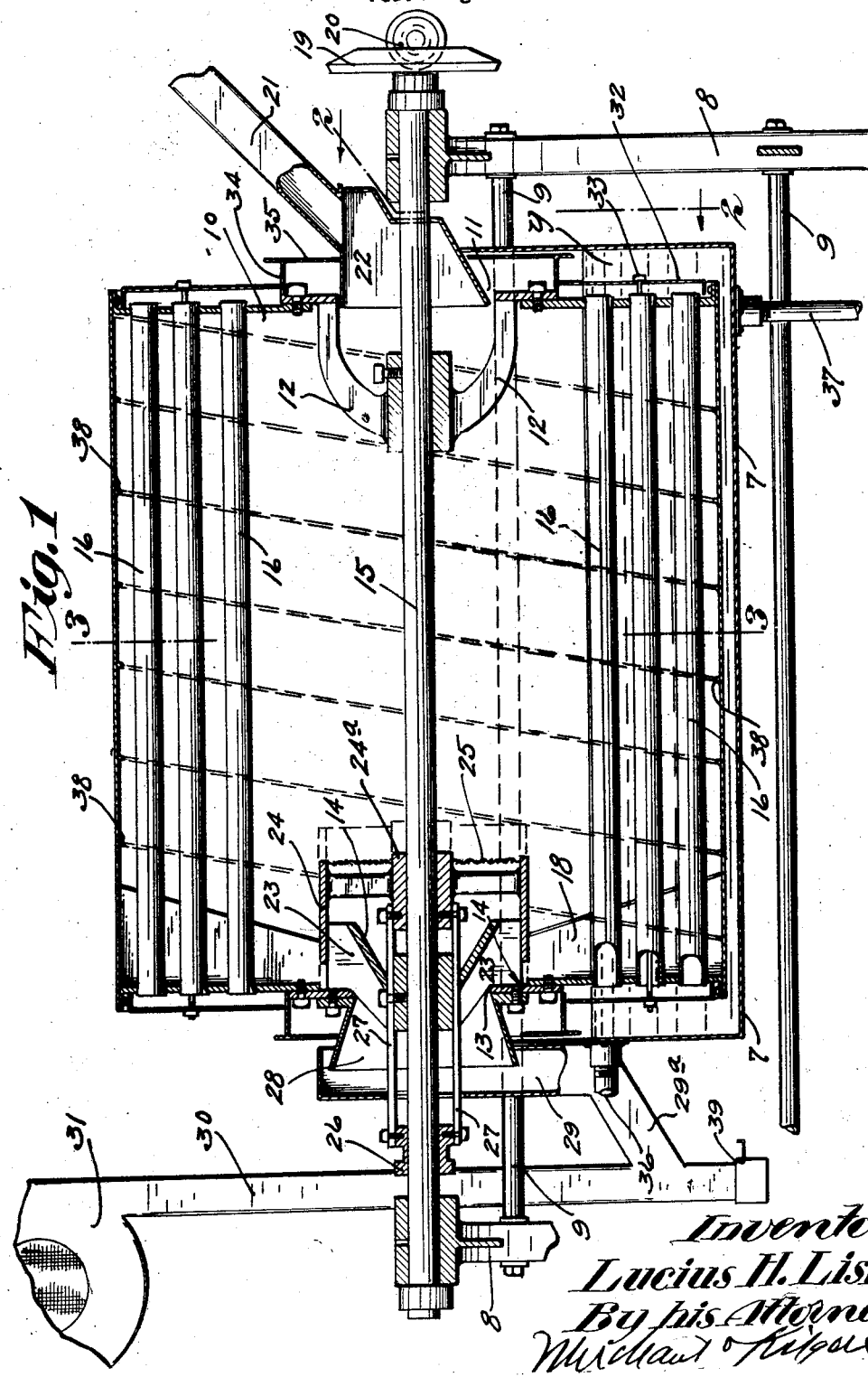
Fig. 1 is a vertical axial section taken through the cooler, some parts being broken away.

The numeral 32 indicates annular baffle plates located adjacent to the open ends of the tubes 16 and, as shown, secured to rotate with the drum by long bolts 33 passed through certain of the tubes. The tank 7 contains water $y$ approximately to the elevation shown in Fig. 1, or high enough to fill all of the lower tubes. The annular baffle plates 32 do not cut off circulation of water to the lower tubes but prevent splashing of the water in its discharge from the ends of the elevator tubes and direct the water onto cylindrical roof-forming flanges 34 projected outward from the respective spider brackets 12 and 14. Annular head plates 35 are secured to the outer edges of the flanges 34 and project radially beyond the same so as to form annular water channels to direct the dripping water from the upper tubes back into the tank.

As shown, the water supply pipe 36 leads into one end of the tank 7, and the water discharge pipe 37 leads from the lower portion thereof. Of course, these pipes 36 and 37 may be provided with suitable valves, not shown, whereby the elevation of the water in the tank may be regulated and maintained.

Figure 5:
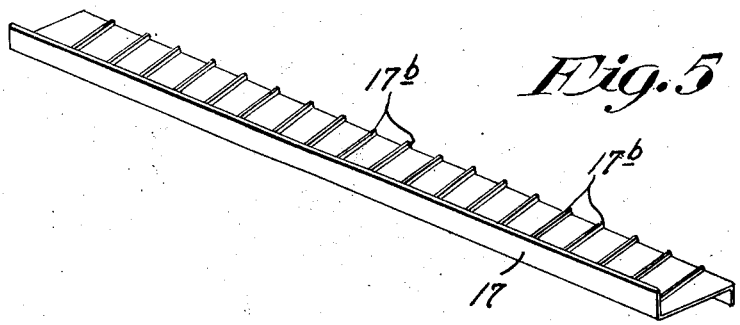
Fig. 5 is a perspective showing one of the internal lifting shelves of the drum.
Figure 6:
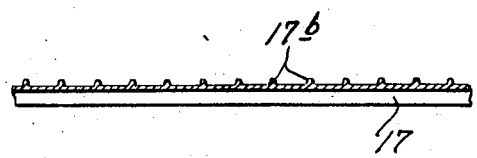
Fig. 6 is a fragmentary longitudinal section of the lifting shelf shown in detail in Fig. 5.

In Figs. 5 and 6, the shelves 17 are shown as provided with oblique transverse ribs $17^b$, which feature, however, is not highly important but when employed assists slightly in propelling the coffee from the receiving toward the discharge end of the drum. As a more efficient means for gradually working the coffee from the receiving toward the discharge end of the drum, the shell of the drum is shown as provided with slightly raised spiral ribs 38.

Figure 2:
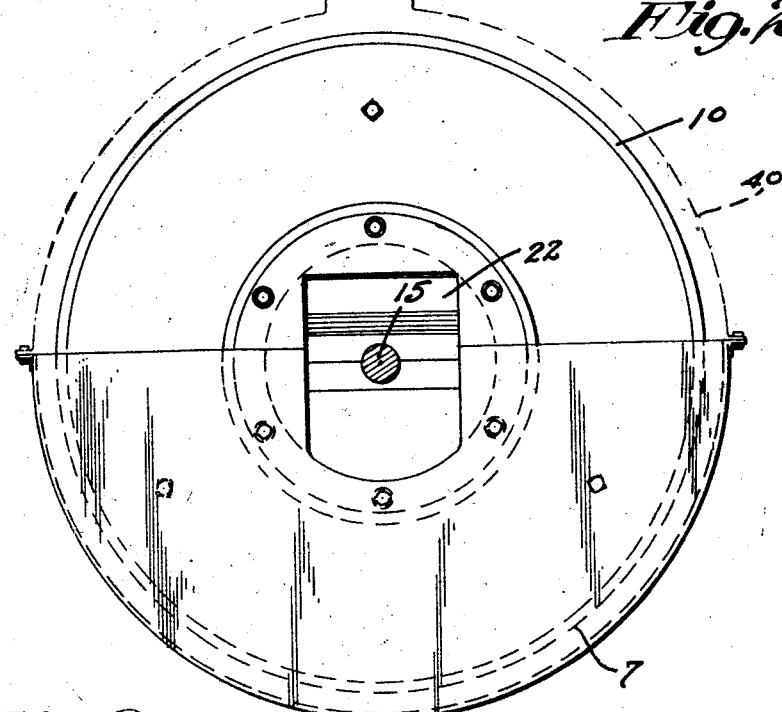
Fig. 2 is a transverse vertical section taken on the line 2—2 of Fig. 1, some parts being removed.

Preferably, the pneumatic elevator leg 30 is provided at a point below the spout $29^a$ with a sliding gate 39. In Fig. 2, the dotted lines marked 40 indicate a removable cover, which may be provided for the tank but which is not an important feature of the invention.

*Operation.*

Under rotation of the drum, the water tubes 16 will take in water when submerged therein at the bottom of the tank, and as they move upward, they will spill the water at their ends and the water will be guided by the baffle plates 32 and by the cylindrical roof-forming flanges 34 back to the bottom of the tank. Thus, the tubes are kept cold, so that they will rapidly cool the coffee that comes into contact therewith under rotation of the drum.

In initiating the cooling action, the proper load of coffee is discharged into the drum and the cylindrical gate 24 will then be moved outward so as to close the discharge passage 14 and keep the coffee within the drum for a proper length of time. Under rotation of the drum, the coffee will be picked up, partly by the tubes but chiefly by the shelves 17, and will be gradually spilled and dropped back in a shower through a restricted draft of air that will then be drawn axially through the drum, through the screen 25, and out through the spout 28, hood 29, spout $29^a$, and lower leg 30. The limited or restricted flow of air through the drum, which takes place while the gate 24 is closed, assists but slightly in the cooling action and is only sufficient to carry off certain of the undesirable vapors. The cooling action is chiefly performed by radiation due either to direct contact with the cold metal surfaces or to a chill in the air, produced by the said cold surfaces.

As soon as the coffee has been cooled sufficiently to render its desirable qualities permanent, the cylindrical gate 24 should be opened so that, under continued rotation of the drum, the coffee, which has been worked toward the delivery end of the drum, chiefly by the spiral rib 38, will be picked up by the elevating blades 18 and discharged under the action of gravity onto the conical body of the spider bracket 14 and thence out through the discharge spout 28. As already indicated, in this discharging action, the webs 23 of the brackets 14 form a plurality of radial discharge channels, which, when turned upward, control the discharge of the cooled coffee into the spout 28. The coffee discharged from the spout 28 into the hood 29 and spout 29ᵃ will be delivered into the elevator leg 30 and, by the fan or blower 31, will be drawn up and discharged to some suitable point. This pneumatic elevator is a desirable though not absolutely necessary feature of the invention. The gate 39, in the extreme lower end of the elevator leg 30, should be opened wide when the coffee is being delivered into said leg, but when the gate valve 24 is closed to confine the coffee within the drum, the strength of the air draft drawn in through the drum may be varied at will by opening and closing the said gate 39.

The baffle plates 32 confine the water discharged from the ends of the tubes and direct the same back into the tank without causing splashing of the water out of the drum or tank. There is such clearance between the said baffle plates and the end flanges on the drum that water will freely circulate. It is important to further note that the flanges 17ᵃ on the shelves 17 hold back the coffee or material being cooled, so that some thereof will be carried completely over the top of the drum. This arrangement gives a very even distribution of the falling coffee throughout the rotation of the drum and causes very even and rapid cooling of the coffee.

Only a short interval of time will be required to properly cool the coffee by the above device or apparatus. In practice, I have found that this can be satisfactorily accomplished under most conditions by a treatment lasting from two to four minutes.

The device or apparatus has been described as a cooling device, since that is its main purpose, but it will, of course, be understood that it could be used as a heating or tempering device, providing that hot, instead of cold, water were used, and such use would, as is evident, be within the scope of my invention as herein disclosed and claimed.

What I claim is:

1. A cooler of the kind described comprising a tank adapted to contain water, a drum having tubes with ends opening at the outer sides of its heads and arranged to be moved through the water of the tank under rotation of the drum, and means for introducing material to be cooled into the drum and for discharging the cold material from the drum.

2. A cooler of the kind described comprising a tank adapted to contain water, a drum having tubes with ends opening at the outer sides of its heads and arranged to be moved through the water of the tank under rotation of the drum, means for introducing material into one end of said drum, and means for discharging the material from the other end of the drum.

3. A cooler of the kind described comprising a tank adapted to contain water, a drum having tubes with ends opening at the outer sides of its heads and arranged to be moved through the water of the tank under rotation of the drum, means for introducing material into one end of said drum, and means for discharging the material from the other end of the drum, said means at the discharge end of the drum comprising a spider bracket and a cylindrical gate telescopically movable thereon.

4. A cooler of the kind described comprising a tank adapted to contain water, a drum having tubes with ends opening at the outer sides of its heads and arranged to be moved through the water of the tank under rotation of the drum, and means for introducing material to be cooled into the drum and for discharging the cold material from the drum, said drum having a lifting shelf interposed between said tubes.

5. A cooler of the kind described comprising a tank adapted to contain water, a drum having tubes with ends opening at the outer sides of its heads and arranged to be moved through the water of the tank under rotation of the drum, and means for introducing material to be cooled into the drum and for discharging the cold material from the drum, said drum having a lifting shelf interposed between said tubes, and the drum at its discharge end having radial elevating blades.

6. The structure defined in claim 3 in which said drum is provided with approximately radial elevating blades at its discharge end arranged to deliver the material to the passages through said spider bracket when said gate is moved to an open position.

7. A cooler of the kind described comprising a tank adapted to contain water, a drum having tubes with ends opening at the outer sides of its heads and arranged to be moved through the water of the tank under rotation of the drum, means for introducing material into one end of said drum, means for discharging the material from the other end of the drum, said means at the discharge end of the drum comprising a spider bracket and a cylindrical gate telescopically movable thereon, the said cylindrical gate and spider bracket affording an open air passage, and a screen closing said air passage against the passage therethrough of the cooled material but permitting the flow of air.

8. A cooler comprising a tank adapted to contain water, an approximately horizontal rotary drum working in said tank, said drum having longitudinal circumferentially spaced tubes with ends opening at the outer sides of the drum head and arranged to move through the water of said tank under rotation of said drum, means for introducing material in said drum through one end thereof, said drum at its other end having an axial discharge passage, and in said discharge passage a spider bracket that affords a plurality of radial discharge channels, and means in said drum for elevating the material and delivering the same out through the channels of said spider bracket.

9. The structure defined in claim 8 in further combination with a sliding gate working telescopically around said spider bracket to open and close the discharge channels thereof.

10. The structure defined in claim 8 in further combination with a sliding gate working telescopically around said spider bracket to open and close the discharge channels thereof, the said gate and bracket having constantly open air channels and the air passage in said gate being covered with a screen.

11. The structure defined in claim 8 in further combination with a sliding gate working telescopically around said spider bracket to open and close the discharge channels thereof, the said gate and bracket having constantly open air channels and the air passage in said gate being covered with a screen, and gate-actuating means extended from said gate to the exterior of said drum.

12. The structure defined in claim 1 in further combination with a cylindrical roof-forming flange surrounding the intake passage of said drum, and an annular baffle plate carried by said drum, surrounding said annular flange, but spaced from the open ends of said tubes.

13. The structure defined in claim 1 in further combination with cylindrical roof-forming flanges surrounding the intake and discharge passages of said drum, and annular baffle plates carried by said drum, surrounding said cylindrical flanges, but spaced from the open ends of said tubes.

14. The structure defined in claim 7 in further combination with cylindrical roof-forming flanges surrounding the intake and discharge passages of said drum, and annular baffle plates carried by said drum, surrounding the respective annular flanges, but spaced from the open ends of said tubes.

15. A cooler of the kind described comprising a tank adapted to contain water, a drum having tubes with ends opening at the outer sides of its heads and arranged to move through the water of the tank under rotation of the drum.

In testimony whereof I affix my signature.

LUCIUS H. LISK,